Figure 1:
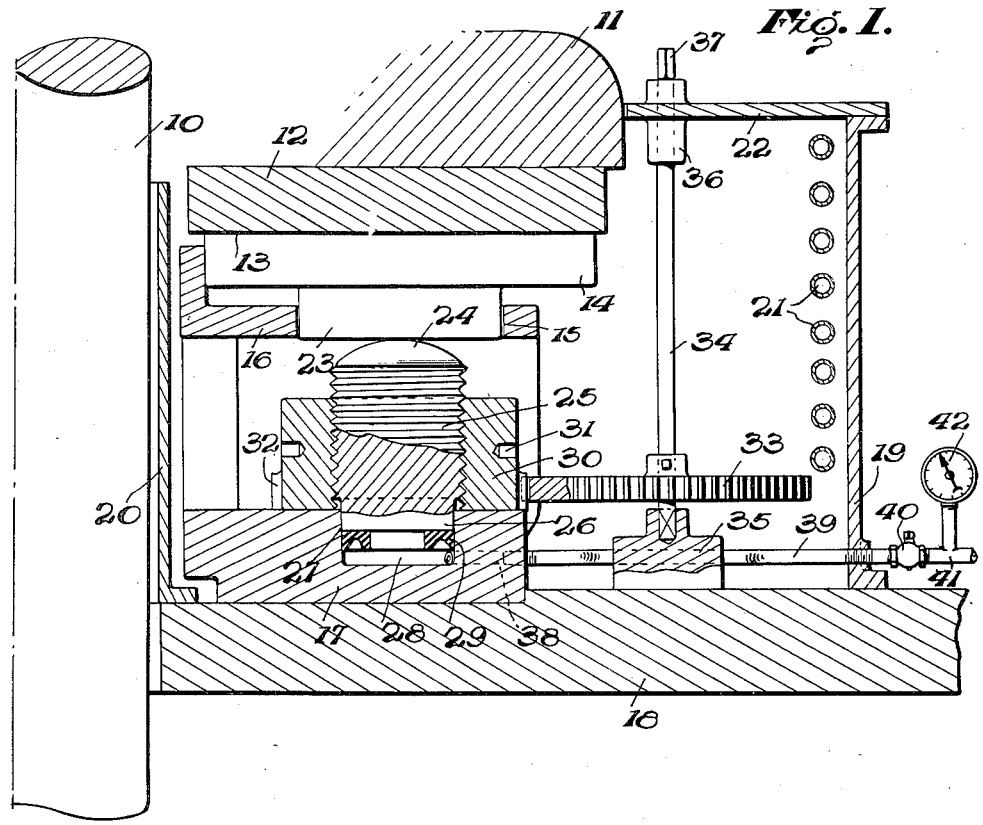

April 16, 1940.   A. KINGSBURY   2,197,432
THRUST BEARING
Filed Aug. 12, 1938

Inventor
Albert Kingsbury.
Cameron, Kerkam + Sutton
Attorneys

Patented Apr. 16, 1940

2,197,432

UNITED STATES PATENT OFFICE 2,197,432

THRUST BEARING

Albert Kingsbury, Greenwich, Conn., assignor to Kingsbury Machine Works, Inc., Philadelphia, Pa., a corporation of Delaware Application August 12, 1938, Serial No. 224,578

12 Claims. (Cl. 308—73)

This invention relates to thrust bearings and more particularly to thrust bearings of the type which employs two or more bearing shoes, segments, or the like, and to a novel method of distributing the load equitably therebetween.

It is an object of this invention to provide a bearing of the type characterized with improved method and means for assuring an equal or other desired distribution of pressure between two or more bearing shoes, segments, or the like, either when initially erecting the bearing or when subsequently testing, overhauling or adjusting the same.

Another object of this invention is to provide a bearing of the type characterized with hydrostatic means for predetermining the distribution of pressure between two or more bearing shoes, segments, or the like, that are to be supported on rigid elements during the normal operation of the bearing.

Another object of this invention is to provide means for equitably distributing the bearing pressure between two or more bearing shoes, segments, or the like, which is applicable to the type of bearing employing jackscrews or other threaded elements for supporting bearing shoes, segments, or the like, during normal operation of the bearing, and whereby substantially equal or other desired distribution of pressure between the several bearing shoes, segments, or the like, may be initially or subsequently obtained without reliance upon a mechanic setting up said jackscrews or other threaded members with equal amounts of load thereon.

Another object of this invention is to provide a novel method and means for assuring a substantially equal or other desired distribution of pressure between two or more bearing shoes, segments, or the like, having particular utility in bearings sustaining relatively large thrust loads and wherein it is thus desirable that the respective bearing shoes, segments, or the like, during the operation of the bearing, be supported upon relatively unyielding and inflexible load sustaining members.

Another object of this invention is to provide a novel method and means for initially establishing an equitable distribution of bearing pressure upon two or more bearing shoes, segments, or the like, which may be readily applied to a wide variety of bearing structures employing supporting means for said bearing shoes, segments, or the like, which are designed to be adjusted to load-sustaining position and then rigidly locked in their positions of adjustment.

Another object of this invention is to provide improved means for predetermining the distribution of pressure between two or more bearing shoes, segments, or the like, of the type characterized which is strong and rugged in character, which is composed of relatively simple parts that are easy to manufacture and install, and which is also highly efficient in operation.

Other objects will appear as the description of the invention proceeds.

The invention is capable of receiving a variety of mechanical expressions, two of which are illustrated on the accompanying drawing, but it is to be expressly understood that the drawing is for purpose of illustration only, and is not to be construed as a definition of the limits of the invention, reference being had to the appended claims for that purpose.

Figure 2:
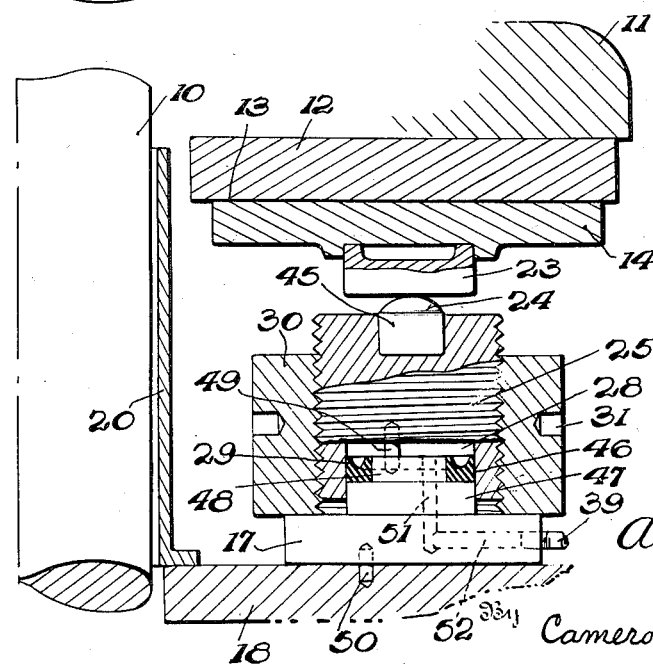

Referring in detail to the accompanying drawing, wherein like reference characters are employed to designate corresponding parts in the figures:

Fig. 1 is a somewhat schematic and diagrammatic vertical cross section of a thrust bearing embodying the present invention; and Fig. 2 is a corresponding view of a second embodiment.

The present invention may be applied to any suitable service and embodied in thrust bearings of any suitable construction, size, number of bearing shoes, segments, or the like, etc., but it is of particular utility in bearings designed to sustain relatively heavy thrust loads. For purposes of illustration the invention is shown as embodied in a thrust bearing for a vertical shaft, but it will be apparent to those skilled in the art that the invention may be embodied with equal facility in bearings for horizontal or inclined shafts, double acting as well as single acting thrust bearings, and thrust bearings applied to a wide variety of uses.

In the form shown in Fig. 1, the shaft 10 is provided in any suitable way with a thrust block 11 with which is associated any suitable thrust collar or runner 12. Cooperating with the bearing face 13 of the collar 12 are two or more bearing shoes 14 of any suitable size and construction, it being understood that the present invention may be applied to the equalization of pressure between any desired number of shoes. As illustrated each shoe is properly located in an aperture 15 in a stationary ring, shoe retaining cage, or other structure 16 of any suitable form and construction which is integral with or retained against displacement with respect to a base plate 17 of any suitable construction mounted on a suitable frame plate, thrust deck or other foundation 18. The bearing is shown as provided with a surrounding wall 19 constituting a housing therefor, and which may be the outer wall of an oil pot or well defined at its inner radial extremity by an oil retaining wall 20. If preferred, however, the oil well may be formed as a one-piece pot of known construction or have any other suitable construction. A cooling coil is indicated at 21 and the housing or well is closed at its top by a cover 22. The foregoing parts are indicated diagrammatically because they may be of any suitable form and construction and constitute no part of the present invention.

Each bearing shoe 14 is preferably supported so that it may tilt both radially and circumferentially with respect to the axis of the bearing in conformity with the principles of the Kingsbury bearing, and to this end the rear supporting portion 23 of each bearing shoe is mounted on the spherical end surface 24 of a threaded stud or jackscrew 25. If preferred the end of the jackscrew or stud may be flat and the spherical surface may be provided upon the rear surface of the shoe. Each jackscrew or stud 25 is provided with a plunger portion 26 at its end opposite its shoe supporting extremity 24, and the base ring or other supporting structure 17 is provided beneath each jackscrew or stud with a corresponding recess 27 in which the plunger portion 26 has a sliding fit. Each recess 27 is deeper than the axial extent of its plunger portion 26 and provides a pressure chamber 28 which may be sealed against the escape of pressure fluid between the plunger surface and recess wall by a packing ring 29 of any suitable construction and material but preferably of the type which automatically tightens and seals the joint between said surfaces when pressure is applied thereto.

Cooperating with the thread on each stud or jackscrew 25 is a nut 30 which is designed to be seated rigidly against the base ring 17 as will be hereinafter explained. Said nut 30 is preferably provided with spanner openings 31 to facilitate its initial location, and also its adjustment for the setting of the nut if access may be readily gained to the interior of the well or housing defined by the wall 19. As shown, however, each nut is provided with gear teeth 32, and cooperating with said teeth on each nut is a gear wheel 33 mounted on a spindle 34 suitably seated in a bearing block 35 at its inner extremity and extending through a bearing 36 in the cover 22. The outer end of spindle 34 is suitably squared or otherwise formed as shown at 37 for engagement with a crank, wrench or other rotating means.

Each pressure chamber 28 communicates through an aperture 38 bored in the base ring with a pipe 39 leading to the exterior of the housing or well wall 19 where all of said pipes 39 are interconnected, as by a cross connection at 40, so that they communicate with a single source of fluid, such as oil, under pressure supplied through pipe 41 from any suitable pressure means, such as a high pressure pump. A gauge 42 is illustrated for showing the pressure delivered to the several pressure chambers 28.

When the bearing is initially erected the parts are assembled in the relationship indicated in Fig. 1. Fluid under pressure is then supplied through pipe 41 and the respective pipes 39 to the pressure chambers 28, the pressure being of such magnitude as to move all of said jackscrews or studs 25 into thrust sustaining engagement with the supporting blocks 23 of the shoes 14. As the fluid supplied to the pressure chambers 28 may be under any suitable pressure, the pressure thus applied to all of the chambers 28 may be of such magnitude as to lift the jackscrews or studs 25 with their bearing shoes 14 into thrust supporting engagement with the collar 12 though the thrust load be relatively great. As all of the pressure chambers 28 are in communication through the pipes 39 and 40, the fluid pressure therein is equalized, and as all of the plungers 26 are of substantially equal size, each jackscrew or stud 25 is thus moved to a position wherein its shoe 14 is carrying its proportionate share of the total load, i. e., the total load divided by the number of bearing shoes. The equal distribution of pressure between the respective shoes being thus established and maintained, each of the spindles 34 is rotated by any suitable means to move its corresponding nut 30 until it seats firmly and rigidly upon the base ring 17, thus locking the jackscrews or studs in their proper positions for maintaining the equal distribution of pressure so established.

In the embodiment shown in Fig. 2, the shaft 10 is provided with a thrust block 11 with which is suitably associated a thrust collar or runner 12 as in the embodiment of Fig. 1. Cooperating with the thrust collar 12 are two or more bearing shoes 14 provided at the rear face thereof with shoe supporting blocks 23 of a form known to the art. Each shoe as here illustrated is mounted on the spherical extremity 24 of a hardened insert 45 suitably set into a recess in the end of each jackscrew or threaded stud 25, here shown as of a somewhat larger relative diameter than in the embodiment of Fig. 1. In this embodiment the inner extremity of each jackscrew or stud 25 is recessed at 46 to provide the pressure chamber 28, and each jackscrew or stud 25 is centered on the base ring or other supporting element 17 by means of a projection 47 having a sliding fit in the recess 46. The projection 47 is shown as of reduced diameter at 48 and the packing or sealing ring 29 surrounds said portion of reduced diameter. If desired, a dowel pin 49 may be interposed between the jackscrew or stud and its projection 47, 48. The base ring or supporting block 17 is suitably retained in position, as by dowels 50, and as in the embodiment of Fig. 1 the bearing elements may be surrounded by a housing or oil well, only the inner oil retaining wall 20 being illustrated. As here shown, each projection 47, 48 and the base ring or supporting block 17 adjacent thereto are provided with right angularly extending passages 51 and 52 which communicate with the pipe 39 leading to the exterior of the housing or well as in the embodiment of Fig. 1.

In the embodiment of Fig. 2, as in the embodiment of Fig. 1, the several pipes 39 are interconnected, and also connected with any suitable source of fluid under pressure, as a high pressure pump, and as in the embodiment of Fig. 1, fluid under pressure may be admitted to all of the pressure chambers 28 to take up the load on the several bearing shoes whereupon, owing to the equalization of pressure in the several pressure chambers 28, each shoe will carry its proportionate share of the entire load, and the nuts 30 may then be screwed down, through use of the spanner openings 31 or by such gearing as illustrated in Fig. 1 or in any other suitable way, until they seat firmly and rigidly on the base ring or supporting block 17.

After the adjustment has thus been obtained as heretofore described and the nuts 30 have been locked in adjusted position the oil or other fluid under pressure may be released from the pressure chambers 28, but if at any future time it is desired to overhaul the bearing and therefore it becomes necessary to reset the jackscrews or studs 25, or if it is desired at any time to check or to test the distribution of the load on the bearing shoes, the fluid under pressure may be readily reintroduced into the several pressure chambers 28 and the equalization of pressure between the several bearing shoes be determined or established.

If for any reasons the shoes are of different size so that for equal bearing pressure per unit of bearing area the load carried by the respective shoes should be in proportion to their bearing areas, the desired distribution of pressure may be obtained by correspondingly proportioning the pressure chambers so that the load sustaining areas on the jackscrews or studs 25 shall be in the same ratio as the desired ratio of the loads on the respective shoes.

It will therefore be perceived that by the present invention a method and means have been provided whereby an equal or any desired distribution of pressure may be established upon two or more bearing shoes when it is desired that in operation said bearing shoes shall be supported upon relatively stout, strong, thrust sustaining studs or elements, such as jackscrews, as is frequently desirable where the loads to be borne are relatively high. At the same time the desired distribution of pressure is effected without reliance upon manual setting of threaded elements, as heretofore required when jackscrews or the like are employed for the support of the several bearing shoes, with the well recognized difficulty of so setting up a plurality of jackscrews or the like that each supported shoe will carry its proportionate share of the load, no more and no less. The pressure distributing means of the present invention thus assures an equal or any other desired distribution of load between the several shoes and then when the desired distribution of pressure has been effected the shoe supporting elements are rigidly locked in their adjusted positions to possess all of the advantages characteristic of jackscrews or other threaded elements as shoe supports so far as strength and rigidity are concerned. The load distributing and adjusting means of the present invention is relatively simple in character, is applicable to a wide variety of bearings of a wide variety of construction, and is easy to operate with assurance that its operation shall effect the desired distribution of pressure between two or more bearing shoes, up to any desired number, without the human factor entering into the determination of load distribution.

While the embodiments of the invention illustrated on the drawings have been described with considerable particularity it is to be expressly understood that the invention is not restricted thereto as the same is capable of receiving a variety of mechanical expressions, only two of which have been illustrated, and as will now be apparent to those skilled in the art the invention may be embodied in other constructions, and changes may be made in the details of construction, arrangement, proportion, etc., of the parts, and certain features used without other features, without departing from the spirit of this invention. Reference is therefore to be had to the appended claims for a definition of the invention.

What is claimed is:

1. In a thrust bearing, in combination with relatively rotatable thrust bearing members including a plurality of bearing shoes, a support for each of the bearing shoes including a threaded member and a member in which said threaded member is mounted, a nut on each threaded member adapted to be engaged with said mounting member for locking the threaded member in adjusted position, and hydrostatic means for predetermining the pressure on said threaded members in advance of setting said nuts in the adjusted positions of said threaded members.

2. In a thrust bearing, in combination with relatively rotatable thrust bearing members including a plurality of bearing shoes, a support for each of the bearing shoes including a threaded member and a member in which said threaded member is mounted, a nut on each threaded member adapted to be engaged with said mounting member for locking the threaded member in adjusted position, each of said threaded members and its mounting member cooperating to provide a pressure chamber, and interconnected means for supplying fluid under pressure to all of said chambers in advance of setting said nuts in the adjusted positions of said threaded members.

3. In a thrust bearing, in combination with relatively rotatable thrust bearing members including a plurality of bearing shoes, a support for each of the bearing shoes including a threaded member and a member in which said threaded member is mounted, a nut on each threaded member adapted to be engaged with said mounting member for locking the threaded member in adjusted position, each of said threaded members having a pressure chamber associated therewith whereby all of said threaded members may be simultaneously moved by fluid pressure in said chambers to pick up the load on their associated shoes, and interconnected means communicating with all of said chambers for supplying said chambers with fluid under pressure to proportion the load equitably between the several shoes in advance of setting said nuts in the adjusted positions of said threaded members.

4. In a thrust bearing, in combination with relatively rotatable thrust bearing members including a plurality of bearing shoes, a support for each of the bearing shoes including a threaded member and a member in which said threaded member is mounted, a nut on each threaded member adapted to be engaged with said mounting member for locking the threaded member in adjusted position, means providing a pressure chamber between the inner end of each threaded member and its mounting member, interconnected means communicating with all of said chambers for supplying said chambers with fluid under pressure to proportion the load on said bearing shoes prior to setting said nuts in the adjusted positions of said threaded members, and means for setting said nuts rigidly against their respective mounting members.

5. In a thrust bearing, in combination with relatively rotatable thrust bearing members including a plurality of bearing shoes, a support for each of the bearing shoes including a threaded member and a member in which said threaded member is mounted, a nut on each threaded member adapted to be engaged with said mounting member for locking the threaded member in adjusted position, each of said threaded members being recessed at its inner end, a plunger on said mounting member cooperating with each recess and providing a pressure chamber therebetween, and means interconnecting said pressure chambers and communicating with a source of fluid under pressure whereby pressure may be applied to all of said pressure chambers simultaneously to predeterminately proportion the load on said shoes in advance of setting said nuts in the adjusted positions of said threaded members.

6. In a thrust bearing, in combination with relatively rotatable thrust bearing members including a plurality of bearing shoes, a support for each of the bearing shoes including a threaded member and a member in which said threaded member is mounted, a nut on each threaded member adapted to be engaged with said mounting member for locking the threaded member in adjusted position, each of said threaded members being formed at its inner end to provide a plunger and said mounting member being recessed to cooperate with each plunger and provide a pressure chamber therebetween, and means interconnecting said pressure chambers and communicating with a source of fluid under pressure whereby pressure may be applied to all of said pressure chambers simultaneously to predeterminately proportion the load on said shoes in advance of setting said nuts in the adjusted position of said threaded members.

7. In a thrust bearing, in combination with relatively rotatable thrust bearing members including a plurality of shoes, a threaded member individual to each shoe and upon which the shoe is pivotally mounted, a supporting member cooperating with each threaded member, a nut on each threaded member adapted to be set against said supporting member, and hydrostatic means cooperating with all of said threaded members and adapted to move the same into positions wherein predetermined loads are applied to said shoes in advance of setting said nuts to retain said threaded members in adjusted position.

8. In a thrust bearing, in combination with relatively rotatable thrust bearing members including a plurality of shoes, a threaded member individual to each shoe and upon which the shoe is pivotally mounted, a supporting member cooperating with each threaded member, a nut on each threaded member adapted to be set against said supporting member, a pressure chamber associated with each threaded member and by which said threaded member may be supported by fluid under pressure, and means for supplying fluid under pressure to all of said chambers to impose predetermined loads on said threaded members preliminarily to setting said nuts to retain said threaded members in adjusted position.

9. In a thrust bearing, in combination with relatively rotatable thrust bearing members including a plurality of shoes, a member individual to each shoe and upon which the shoe is mounted, a supporting member cooperating with each mounting member, locking means associated with each mounting member, a pressure chamber associated with each mounting member and by which said member may be supported by fluid under pressure, and means for supplying fluid under pressure to all of said chambers to impose predetermined loads on said mounting members preliminarily to operating said locking means to retain said mounting means in adjusted position.

10. In a thrust bearing, in combination with relatively rotatable thrust bearing members including a plurality of bearing shoes and rigid supporting members on which said shoes are mounted, means for applying hydrostatic pressure simultaneously to all of said members to predeterminately proportion the load between said members, and means operable while said members are supported by said hydrostatic pressure for locking said members in position to retain said predetermined distribution of pressure on said shoes as effected by said hydrostatic pressure.

11. In a thrust bearing, in combination with relatively rotatable thrust bearing members including a plurality of bearing shoes and rigid supporting members on which said shoes are mounted, means for applying hydrostatic pressure simultaneously to all of said members to predeterminately proportion the load between said members, said means including cooperating plunger and recess means providing a pressure chamber individual to each shoe, and means operable while said members are supported by said hydrostatic pressure for locking said members in position to retain said predetermined distribution of pressure on said shoes as effected by said hydrostatic pressure.

12. In a thrust bearing, in combination with relatively rotatable thrust bearing members including a plurality of bearing shoes and rigid supporting members on which said shoes are mounted, means for applying hydrostatic pressure simultaneously to all of said members to predeterminately proportion the load between said members, and means operable while said members are supported by said hydrostatic pressure for locking said members in position to retain said predetermined distribution of pressure on said shoes as effected by said hydrostatic pressure, said last named means including a member associated with each supporting member and adjustable while said supporting member is sustained by hydrostatic pressure to retain said supporting member in adjusted position after said hydrostatic pressure is removed.

ALBERT KINGSBURY.